United States Patent [19]
Sheffer et al.

[11] Patent Number: 5,131,019
[45] Date of Patent: Jul. 14, 1992

[54] SYSTEM FOR INTERFACING AN ALARM REPORTING DEVICE WITH A CELLULAR RADIO TRANSCEIVER

[75] Inventors: Eliezer A. Sheffer, Long Island, N.Y.; Ronald J. Chebra, Mercerville; Richard W. Haff, Vincentown, both of N.J.

[73] Assignee: VerSuS Technology, Inc., Trenton, N.J.

[21] Appl. No.: 497,782

[22] Filed: Mar. 21, 1990

Related U.S. Application Data

[63] Continuation of Ser. No. 183,045, Apr. 19, 1988, abandoned, which is a continuation-in-part of Ser. No. 129,644, Dec. 7, 1987, abandoned, which is a continuation-in-part of Ser. No. 62,174, Jun. 12, 1987, Pat. No. 4,868,859.

[51] Int. Cl.[5] ............................................. H04M 11/04
[52] U.S. Cl. ........................................ 379/39; 379/59
[58] Field of Search ..................... 379/32, 33, 37, 38, 379/39, 40, 42, 43, 44, 46, 47, 48, 49, 51, 59, 60

[56] References Cited
U.S. PATENT DOCUMENTS

| | | |
|---|---|---|
| 3,711,647 | 1/1973 | Boyer . |
| 3,786,502 | 1/1974 | Stendig et al. . |
| 3,852,740 | 12/1974 | Haymes . |
| 3,864,674 | 2/1975 | Worsham ........................... 340/224 |
| 3,868,439 | 8/1975 | Gerard . |
| 3,912,875 | 10/1975 | Katz . |
| 3,914,692 | 10/1975 | Seaborn ............................. 340/224 |
| 4,012,596 | 3/1977 | West, Jr. et al. . |
| 4,071,711 | 1/1978 | Beaupre et al. . |
| 4,097,690 | 6/1978 | Kuntz et al. . |
| 4,291,197 | 9/1981 | Yonaga . |
| 4,369,516 | 1/1983 | Byrns . |
| 4,371,751 | 2/1983 | Hilligoss, Jr. et al. . |
| 4,390,750 | 6/1983 | Bartelink . |
| 4,394,540 | 7/1983 | Willis et al. . |
| 4,442,320 | 4/1984 | James et al. ............................. 379/42 |
| 4,465,904 | 8/1984 | Gottsegen et al. ................ 379/42 X |
| 4,521,643 | 6/1985 | Dupuis et al. ..................... 379/50 X |
| 4,521,645 | 6/1985 | Carroll . |
| 4,523,184 | 6/1985 | Abel . |
| 4,555,592 | 11/1985 | Deinzer . |
| 4,562,307 | 12/1985 | Bursztejn et al. . |
| 4,568,800 | 2/1986 | Orikasa . |

(List continued on next page.)

FOREIGN PATENT DOCUMENTS

| | | | |
|---|---|---|---|
| 0011444 | 5/1980 | European Pat. Off. . | |
| 2295506 | 7/1976 | France . | |
| 55-77248 | 6/1980 | Japan .................................... | 379/39 |
| 60-247365 | 12/1985 | Japan .................................... | 379/39 |
| 2191365 | 12/1987 | United Kingdom ................ | 379/40 |
| 2194119 | 2/1988 | United Kingdom ................ | 379/40 |

OTHER PUBLICATIONS

"Cellular Communication Goes Off-Road to Transmit Alarms", Security, vol. 24, No. 5, May 19, 1987, p. 18.

(List continued on next page.)

Primary Examiner—Thomas W. Brown
Assistant Examiner—Stella L. Woo
Attorney, Agent, or Firm—Weiser & Stapler

[57] ABSTRACT

A system for interfacing an alarm reporting unit with a cellular radio transceiver so that the data which is produced by the alarm reporting unit is effectively matched to the radio transceiver, irrespective of its initial format, includes circuitry for matching the format of the alarm reporting unit to that of the cellular radio transceiver, and circuitry for matching the format of the cellular radio transceiver to that of the alarm reporting unit, to permit interactive communications which assure the reliable transmission of data while allowing suitable acknowledgement signals to be returned to the alarm reporting unit to regulate the effective transmission of data within the system, and isolation circuitry to effectively separate the alarm reporting unit from the cellular radio transceiver so that the alarm reporting unit can communicate with a monitoring facility via the cellular radio transceiver, as well as the wired telephone network. This further enables the data being produced to be simultaneously applied to the cellular radio transceiver as well as other communicating media which may be employed for purposes of redundancy.

27 Claims, 7 Drawing Sheets

U.S. PATENT DOCUMENTS

| | | | |
|---|---|---|---|
| 4,641,127 | 2/1987 | Hogan et al. | 379/40 |
| 4,652,859 | 3/1987 | Van Wienen | 379/40 X |
| 4,658,096 | 4/1987 | West, Jr. et al. | 379/59 |
| 4,688,244 | 8/1987 | Hannon et al. | 379/44 X |
| 4,718,079 | 1/1988 | Rabito | 379/39 |
| 4,718,080 | 1/1988 | Serrano et al. | 379/59 |
| 4,750,197 | 6/1988 | Denekamp et al. | 379/44 X |
| 4,887,290 | 12/1989 | Dop et al. | 379/40 |

OTHER PUBLICATIONS

Sanchez, "Design of a Multiple Access Radio System for Rural Telephony", Nov. 1983, *Telecommunication Journal*, vol. 5–XI/1983, pp. 615–621.

Grandchamp, "EXLOCRA: Local Extension by Radio", Aug. 1982, *Telecommunication Journal*, vol. 49––VIII/1982, pp. 477–480.

Miyawaki et al., "Radio Subscriber System", Apr. 1979, *NEC Research & Development* (Japan), No. 53, pp. 36–45.

Barresi et al., "The Problem of Radio Telephone Systems for Rural Subscribers", Jun. 1978, International Conf. on Comm., 4–7 Jun. 1978, pp. 41.5.1 to 41.5.5.

Komura et al., "Subscriber Radio Telephone System for Rural Areas", Apr. 1976, *Japan Telecommunication Review*, vol. 18, No. 2, pp. 94–100.

Hagen, "New Rural Radiotelephone Brings Normal Service to Near-Impossible Areas", Sep. 22, 1975, *Telephony*, vol. 189, No. 12, pp. 40–42, 46, 47.

Edwards, "Fixed Subscriber Radio Systems at V.H.F. and U.H.F.", Dec. 1972, *Proc. of Inst. Radio & Electronics Eng.* (Australia), vol. 33, No. 12, pp. 561–572.

Tada et al., "Model HA-2000 Home-Security System", *Mitsubishi Electric Advance*, vol. 32, Sep. 1985, computed *Abstract*.

Biasiotti, "Centralized Alarm System for Urban and Lond Distance Areas Application", *Itatel;* computer *Abstract*.

Scala, "Comparative Evaluation of External Alarm Transmission Media", Computer *Abstract*.

Abstract–U.S. Pat. No. 4,542,262 (Ruff) Sep. 17, 1985.

Abstract–U.S. Pat. No. 4,417,100 (Carlson et al.) Nov. 22, 1983.

Abstract–U.S. Pat. No. 4,278,841 (Regennitter et al.) Jul. 14, 1981.

Abstract–U.S. Pat. No. 4,246,443 (Smith) Jan. 20, 1981.

Abstract–U.S. Pat. No. 4,219,698 (Birilli et al.) Aug. 26, 1980.

Abstract–U.S. Pat. No. 4,101,835 (Novotny et al.) Jul. 18, 1978.

Abstract–U.S. Pat. No. 4,087,638 (Hayes et al.) May 2, 1978.

Abstract–U.S. Pat. No. 4,082,919 (Danford et al.) Apr. 4, 1978.

Stuart Crump, Jr., "AB1X: Landline Emulator for Cellular", *Personal Communication Technology*, Jun. 1986, pp. 39 & 42.

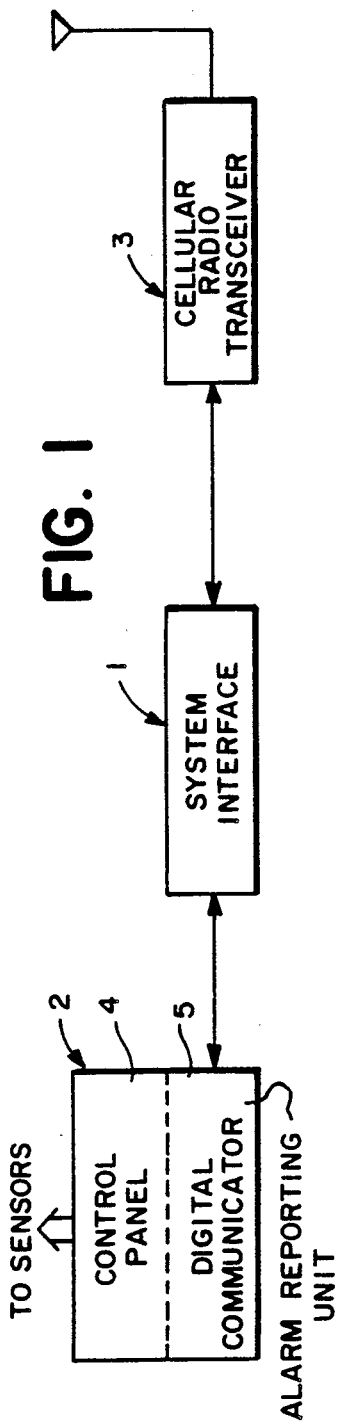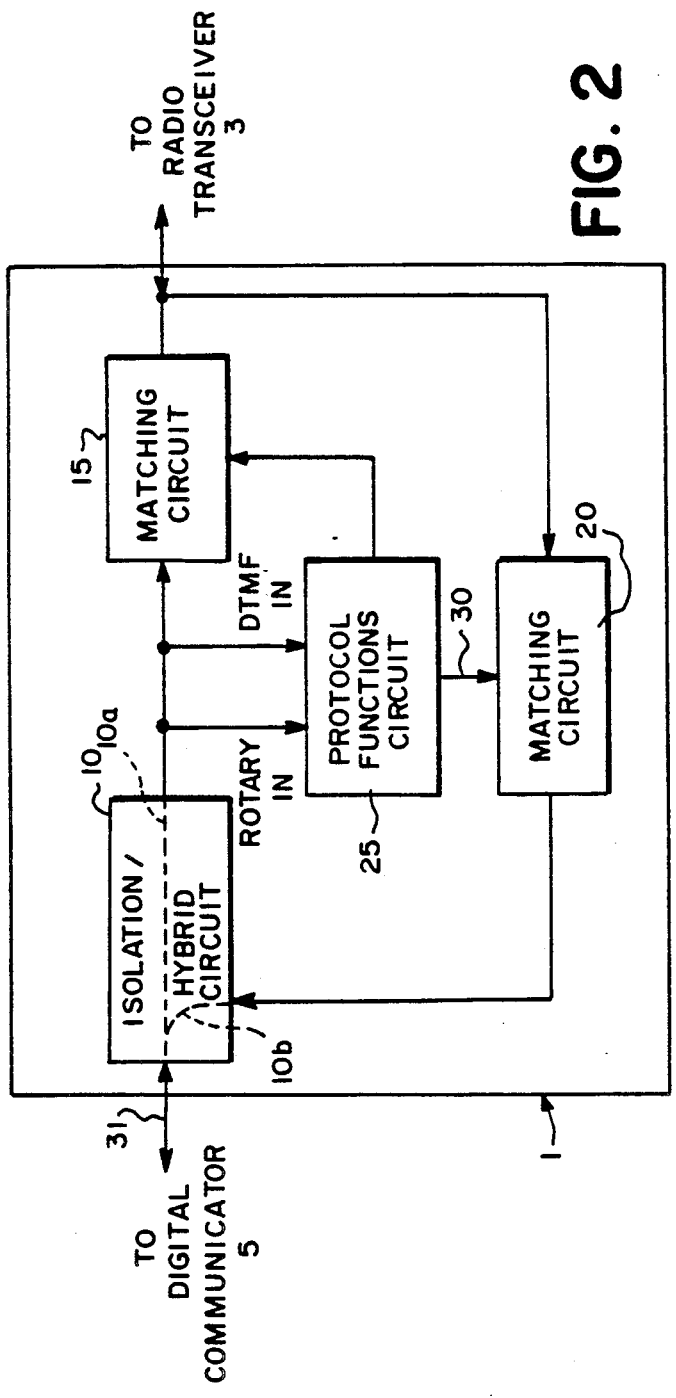

SYSTEM FOR INTERFACING AN ALARM REPORTING DEVICE WITH A CELLULAR RADIO TRANSCEIVER

This application is a continuation of application Ser. No. 07/183,045, filed Apr. 19, 1988, now abandoned which is a continuation-in-part of prior co-pending U.S. patent application Ser. No. 129,644, filed Dec. 7, 1987 and entitled "System for Interfacing an Alarm Reporting Device With a Cellular Radio Transceiver", now abandoned, which is itself a continuation-in-part of prior co-pending U.S. patent application Ser. No. 062,174, filed Jun. 12, 1987 and entitled "Supervised, Interactive Alarm Reporting System" now U.S. Pat. No. 4,868,859. The subject matter of each of these patent applications is incorporated by reference as if fully set forth herein.

BACKGROUND OF THE INVENTION

The present invention relates generally to alarm reporting systems, and in particular, to an alarm reporting system which makes use of a cellular radio transceiver to establish communications between a remote location and a central monitoring facility.

In an effort to satisfy the ever-increasing need for the remote monitoring of various premises, including both business and home applications, a variety of security systems have been developed to establish effective communications between a remotely located alarm monitoring device and a central monitoring facility. Many of these systems are generally described in my earlier co-pending U.S. patent application Ser. No 062,174, filed Jun. 12, 1987 and entitled "Supervised, Interactive Alarm Reporting System".

Described are both relatively simple, as well as more comprehensive systems for establishing communications between the remote location to be monitored and the central monitoring facility. In each case, means are provided for alerting the central monitoring facility when an alarm condition is indicated (for the simpler configurations) or verified (for the more comprehensive systems). However, heightened reliability is achieved in accordance with the invention described in my earlier U.S. patent application Ser. No. 062,174 by providing an alarm reporting system which has a local terminal comprised of a supervised derived channel communicator, and a one-way radio communicator, interconnected by a control unit which provides for interactive operation of the derived channel unit and the radio transmitter according to the alarm conditions which may arise at the premises, and the existing condition of the equipment comprising the local terminal. Such an alarm reporting system has been found to be particularly useful in effectively and reliably advising a central monitoring facility of a potential alarm condition irrespective of conditions at the remote location, or efforts to tamper with the alarm reporting system.

Irrespective of the system which is used, once it is determined that a potential alarm condition exists and that the system is to be exercised to advise the central monitoring facility of this potential alarm condition, steps must be taken to make sure that data developed at the remote location is effectively transmitted to the central monitoring facility to make sure that the potential alarm condition is correctly reported.

Generally, alarm data is developed within a control panel which receives data from one or more sensors positioned throughout the remote premises which is being monitored, and which interprets the data which is received to determine the occurrence of an alarm condition. If an alarm condition is detected, a digital communicator is operated to send an appropriate message to the remote monitoring facility. Traditionally, wired communications or dedicated radio communications have been used to interconnect the control panel and the remote monitoring facility. However, with the increased availability of cellular radio communications, and the advent of more comprehensive alarm reporting systems which advantageously use such radio communications, it remained to develop a system for assuring effective communications between a remote location and a central monitoring facility irrespective of the particular communicating medium being employed.

SUMMARY OF THE INVENTION

It is therefore a primary object of the present invention to provide an effective means for establishing reliable communications between an alarm reporting system stationed at a remote location and a central monitoring facility.

It is also an object of the present invention to provide a system which promotes effective communications between a remote location and a central monitoring facility while assuring the accurate transmission of data irrespective of the means of communication which are being used.

It is also an object of the present invention to provide a system which promotes effective communications between a remote location and a central monitoring facility irrespective of the format of the data which is to be transmitted.

It is also an object of the present invention to provide a system which promotes effective communications between a remote location and a central monitoring facility making use of cellular radio communications.

It is also an object of the present invention to provide a single system for promoting effective communications between a remote location and a central monitoring facility making use of either land based (wired) communications or cellular radio communications.

It is also an object of the present invention to provide a system which promotes effective communications between a remote location and a central monitoring facility as previously outlined, yet which is reliable in operation and economical in construction and use.

These and other objects are achieved in accordance with the present invention by providing a system for interfacing an alarm reporting unit with a cellular radio transceiver so that the data which is produced by the alarm reporting unit is effectively matched to the radio transceiver, irrespective of its initial format. Preferably, this is accomplished in a way which permits the data being produced to be applied to the cellular radio transceiver or other communicating media (primarily land based, wired communications) which may be employed for purposes of redundancy.

Such a system basically includes means for matching the format of the alarm reporting unit to that of the cellular radio transceiver, and means for matching the format of the cellular radio transceiver to that of the alarm reporting unit. This permits interactive communications which assure the reliable transmission of data to the central monitoring facility, while allowing suitable acknowledgment signals to be returned to the alarm reporting unit to regulate the effective transmission of data within the system. Isolation circuitry is provided to effectively separate the alarm reporting unit from the cellular radio transceiver so that the alarm reporting unit (digital communicator) can communicate with the central monitoring facility via the cellular radio transceiver, as well as the wired telephone network.

Making use of the system interface of the present invention, it is possible to establish effective communications between an alarm reporting unit and a cellular radio transceiver, as desired. However, it is further made possible to couple the alarm reporting unit with both a cellular radio transceiver and a wired communicating system, for selective operation according to prevailing conditions, affording a significant degree of transfer path redundancy without requiring additional alarm reporting equipment. In either case, supervised as well as unsupervised alarm reporting systems may be used, either in connection with a cellular radio transceiver, wired communications, or both, as desired.

For further detail regarding a preferred embodiment system interface according to the present invention, reference is made to the detailed description which is provided below, together with the following illustrations.

BRIEF DESCRIPTION OF THE DRAWINGS

FIG. 1 is a block diagram showing use of the system interface of the present invention to interconnect an alarm reporting unit and a cellular radio transceiver.

FIG. 2 is a block diagram showing the system interface of FIG. 1.

In the several views provided, like reference numerals denote similar structure.

DETAILED DESCRIPTION OF PREFERRED EMBODIMENTS

Figure 3:
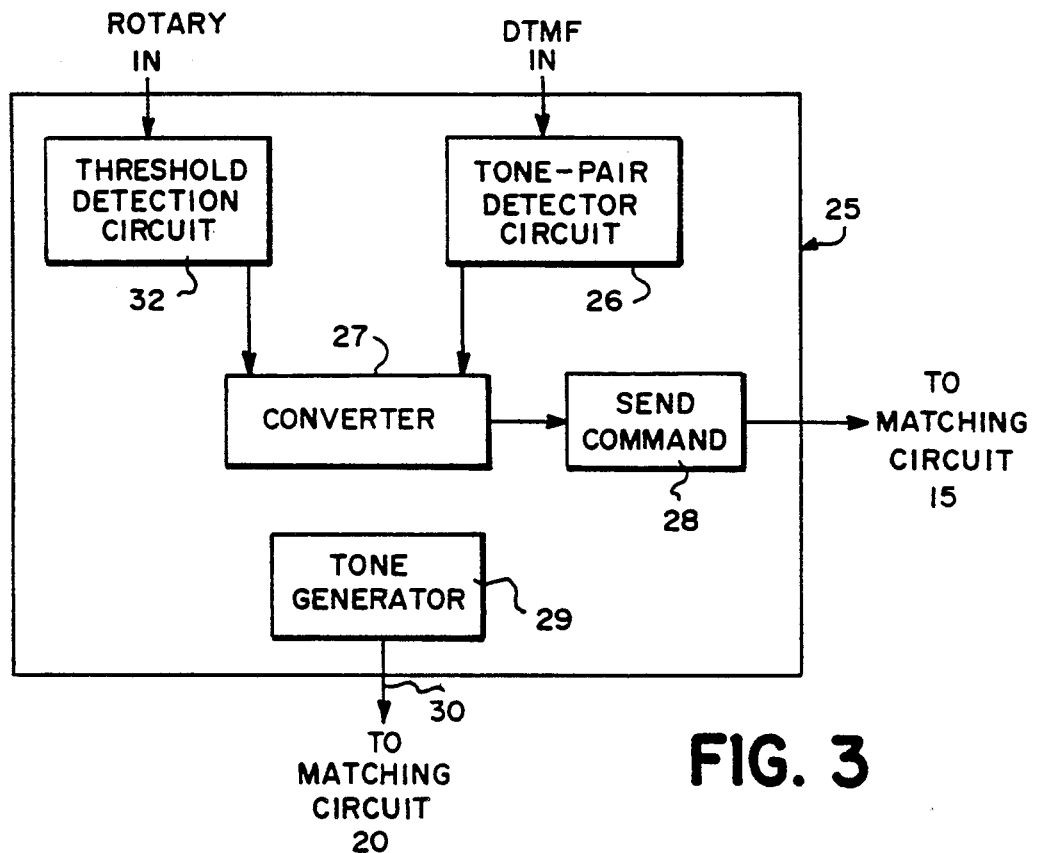
FIG. 3 is a block diagram showing the manner in which the various protocol functions associated with the alarm reporting unit and the cellular radio transceiver are accommodated in accordance with the present invention.

FIG. 1 generally illustrates use of the system interface 1 of the present invention to effectively "match" an alarm reporting unit 2 and a cellular radio transceiver 3. The alarm reporting unit 2 includes a control panel 4 which operates to receive signals from one or more remote sensors (not shown) positioned at desired locations throughout a particular premises, and to develop a digital signal which is indicative of the present condition of the sensors associated with the alarm reporting unit 2. A digital communicator 5 is provided to transmit such digital signals to a central facility which is charged with the responsibility of monitoring conditions at the remote premises.

The cellular radio transceiver 3 may be any one of a variety of conventionally available units for establishing effective communications via the cellular telephone network, especially units which are adapted to achieve the improvements which are discussed in my prior copending U.S. patent application Ser. No. 062,174.

It is to be understood that the radio transceiver 3, as well as the alarm reporting unit 2, are conventionally available components which do not in themselves form part of the present invention, and that the configuration of the alarm reporting unit 2 and the radio transceiver 3 may be varied in accordance with the present invention to establish effective communications between these two elements, as desired.

FIG. 2 illustrates specifics of the system interface 1 of the present invention As shown, the digital communicator 5 of the alarm reporting unit 2 communicates with an isolation/hybrid circuit 10 A variety of conventionally available circuits may be used to develop the function of the isolation/hybrid circuit 10, such as a 2/4 wire conversion circuit or the like, which makes use of telephone coupling transformers and amplifiers to convert the bi-directional signal existing on the telephone loop into two discrete uni-directional signals This enables two-way communications through the system interface 1, while providing sufficient isolation between the alarm reporting unit 2 and the radio transceiver 3 to permit simultaneous connection of the digital communicator 5 to separate media, the purpose of which will become apparent from the description to be provided below.

A pair of cooperating matching circuits 15, 20 operate to interconnect the isolation/hybrid circuit 10 with the radio transceiver 3. One of the matching circuits 15 is provided to effectively match the output (format) of the digital communicator 5 with the input (format) of the radio transceiver 3. The other of the matching circuits 20 is provided to effectively match the output (format) of the radio transceiver 3 with the input (format) of the digital communicator 5 In each case, this "matching" can involve correlation of the voltages and/or formats of the respective signals being interconnected. The voltages and formats of these signals are based upon the configuration of the alarm reporting unit 2 and the radio transceiver 3 which are being used The precise configuration of the matching circuits 15, 20 will therefore necessarily depend upon the signal requirements of the selected digital communicator 5 and cellular radio transceiver 3. However, the specifics of these matching circuits will be readily understood by persons of ordinary skill in the art, using conventionally available circuit designs.

The isolation/hybrid circuit 10 (via the path 10a) combines with the matching circuit 15 to effectively interface the digital communicator 5 of the alarm reporting unit 2 with the radio transceiver 3, to allow the alarm reporting unit 2 to effectively communicate with a central monitoring facility via the radio transceiver 3 As part of this communication, it is common practice for the central monitoring facility to provide the digital communicator 5 with certain acknowledgement signals which serve to regulate the transmission of data from the alarm reporting unit to the central monitoring facility. The matching circuit 20, in combination with the isolation/hybrid circuit 10 (via the path 10b), operates to effectively pass these acknowledgement signals from the radio transceiver 3 to the digital communicator 5 of the alarm reporting unit 2, completing the needed interface between these two components.

A protocol functions circuit 25 is provided to establish initial communications between the digital communicator 5 of the alarm reporting unit 2 and the radio transceiver 3 (through the matching circuit 15), irrespective of the protocol of the digital communicator 5. Specifically, the signaling protocol of the digital communicator 5 may involve either a dual tone multi-frequency (DTMF) signal or a rotary pulse signal, depending upon the basic service which is subscribed to at the premises provided with the alarm reporting unit 2. Steps must therefore be taken to make sure that the system interface 1 is able to accommodate either of these two protocols To this end, appropriate commands must be provided to decode dialing information received from the digital communicator, or to promote other functions which are needed to automatically initiate the transmission of data through the system. The protocol functions circuit 25 therefore operates to assure that the signals (pulses) which are received from the digital communicator 5 will be recognized by the matching circuit 15, irrespective of their protocol, for appropriate delivery to the radio transceiver 3. FIG. 3 illustrates the protocol functions circuit 25 in greater detail.

DTMF signals are processed in substantially conventional fashion, with the detection of tone-pairs selected from the sixteen tone-pairs which are conventionally provided in this format by a detector circuit 26. The detector circuit 26 communicates with a converter 27 which, following the detection of a recognized tone-pair, operates to convert the recognized tone-pair to a corresponding digit. Upon assembly of the digits to be transmitted, a send command is produced at 28 which causes the identified digits to be delivered to the radio transceiver 3. This initiates communications with the central monitoring facility, with necessary acknowledgement signals being returned to the digital communicator 5 via the matching circuit 20.

It is important to note here that due to the signal separation provided by the isolation/hybrid circuit 10, and because the detection of DTMF signals proceeds in a fashion similar to that used by the conventional (wired) telephone network, the processing of DTMF signals in accordance with the present invention is fully compatible with the processing of DTMF signals through the conventional, wired telephone network. This allows the system interface 1 to interconnect the alarm reporting unit 2 with the radio transceiver 3, while simultaneously permitting interconnection of the alarm reporting unit 2 with the conventional, wired telephone network (via a conventional RJ11 connection).

Ordinarily, the pulses of a rotary signal are detected by a current sensing technique wherein a voltage source within the interfacing system is used to cause a current to flow when a pulse is present. However it has been found that the voltage source which is needed for this pulse detection technique excludes the possibility of simultaneously connecting the digital communicator 5 with both the radio transceiver 3 and the conventional, wired telephone network because it will interfere with the voltage source within the telephone network. In addition to violating certain FCC requirements regarding standards of interconnection to the telephone network, such interference prevents an operative connection to the wired telephone network.

In accordance with the present invention, the pulses of a rotary signal are detected making use of an intentionally injected signal, which is synthesized at 29. Preferably, an inaudible, sinusoidal signal at the upper end of the audio spectrum (e.g., 10–30 kHz) is used for this purpose. The synthesized frequency is preferably continuously injected into the network at 30, entering the matching circuit 20, which causes the injected signal to be applied at the output 31 (FIG. 2) of the digital communicator 5. Since the presence or absence of a rotary pulse at the output 31 of the digital communicator 5 will result in a change in impedance at this node, the degree to which the injected frequency is absorbed at the node 31 will vary depending upon the presence or absence of a pulse, as well as the number of pulses which are encountered A threshold detection circuit 32 is provided to monitor the output of the digital communicator 5, to monitor changes in level resulting from the foregoing scheme The threshold detection circuit 32, which is otherwise conventional in configuration, therefore allows a determination to be made as to the initiation of rotary pulses, as well as the number of pulses which are being produced.

The threshold detection circuit 32 communicates with the converter 27, which operates as previously described to develop a sequence of numbers for the purpose of dialing. This developed sequence of numbers is again delivered to the radio transceiver 3 responsive to a send command, at 28, as previously described in connection with the processing of DTMF signals.

The foregoing permits a rotary signal to be interpreted without requiring use of the voltage source which was previously needed to accomplish this function. Consequently, in addition to effectively initiating communications between the digital communicator 5 and the radio transceiver 3, the above-described rotary pulse detection scheme, together with the signal separation provided by the isolation/hybrid circuit 10, allows the system interface 1 to interconnect the alarm reporting unit 2 with the radio transceiver 3, while simultaneously permitting interconnection of the alarm reporting unit 2 with the conventional, wired telephone network (via a conventional RJ11 connection).

Figure 4:
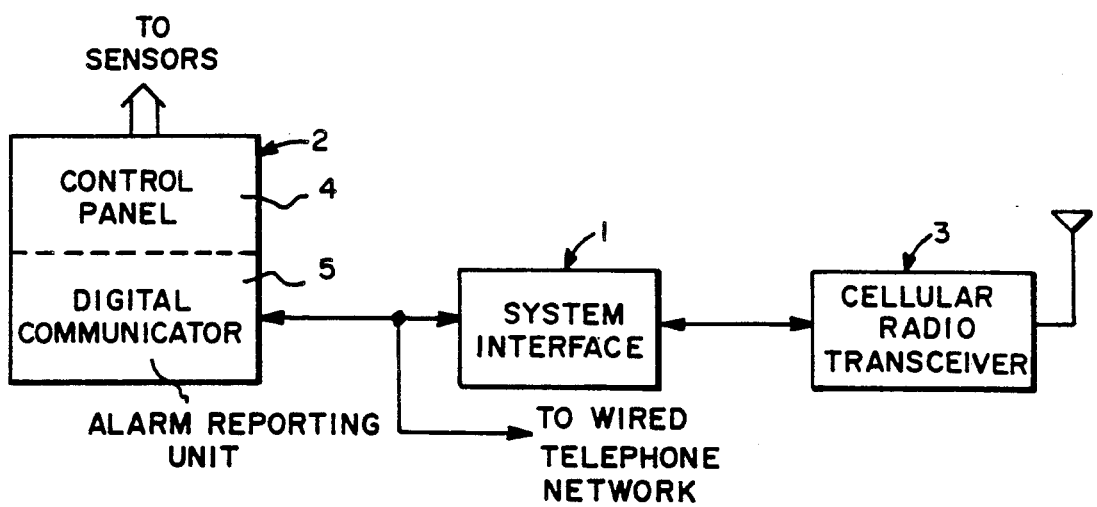
FIG. 4 is a block diagram showing use of the system interface of the present invention to interconnect an alarm reporting unit with both a cellular radio transceiver and a wired communicating system.

Accordingly, it is seen that the system interface 1 of the present invention provides an effective means for connecting the alarm reporting unit 2 with the cellular radio transceiver 3, as previously shown in FIG. 1 However, resulting from the effective isolation provided by the isolation/hybrid circuit 10 and the DTMF and rotary signal detection schemes which are embodied in the protocol functions circuit 25, the system interface 1 additionally permits simultaneous connection of the alarm reporting unit 2 with both the cellular radio transceiver 3 and the conventional, wired telephone network (via an RJ11 connection), as shown in FIG. 4 In addition to the advantageous redundancy which this provides, simultaneous connection to the wired telephone network also promotes inexpensive two-way communications with the alarm reporting unit 2. Separate from the acknowledgement signals which are used to effectively regulate the transmission of data by the alarm reporting unit 2, as previously described, advancements in the versatility of the alarm reporting unit 2 have created a need to directly access (address) the alarm reporting unit 2 to take advantage of certain supervisory functions which this unit can incorporate (e.g., remote control functions, load management, etc ). Simultaneous connection of the alarm reporting unit 2 with the wired telephone network, as well as the cellular radio transceiver 3, allows necessary supervising signals to be provided to the alarm reporting unit 2 via less costly wired communications, avoiding the need to resort to more costly cellular radio communications to provide this function.

Figure 5:
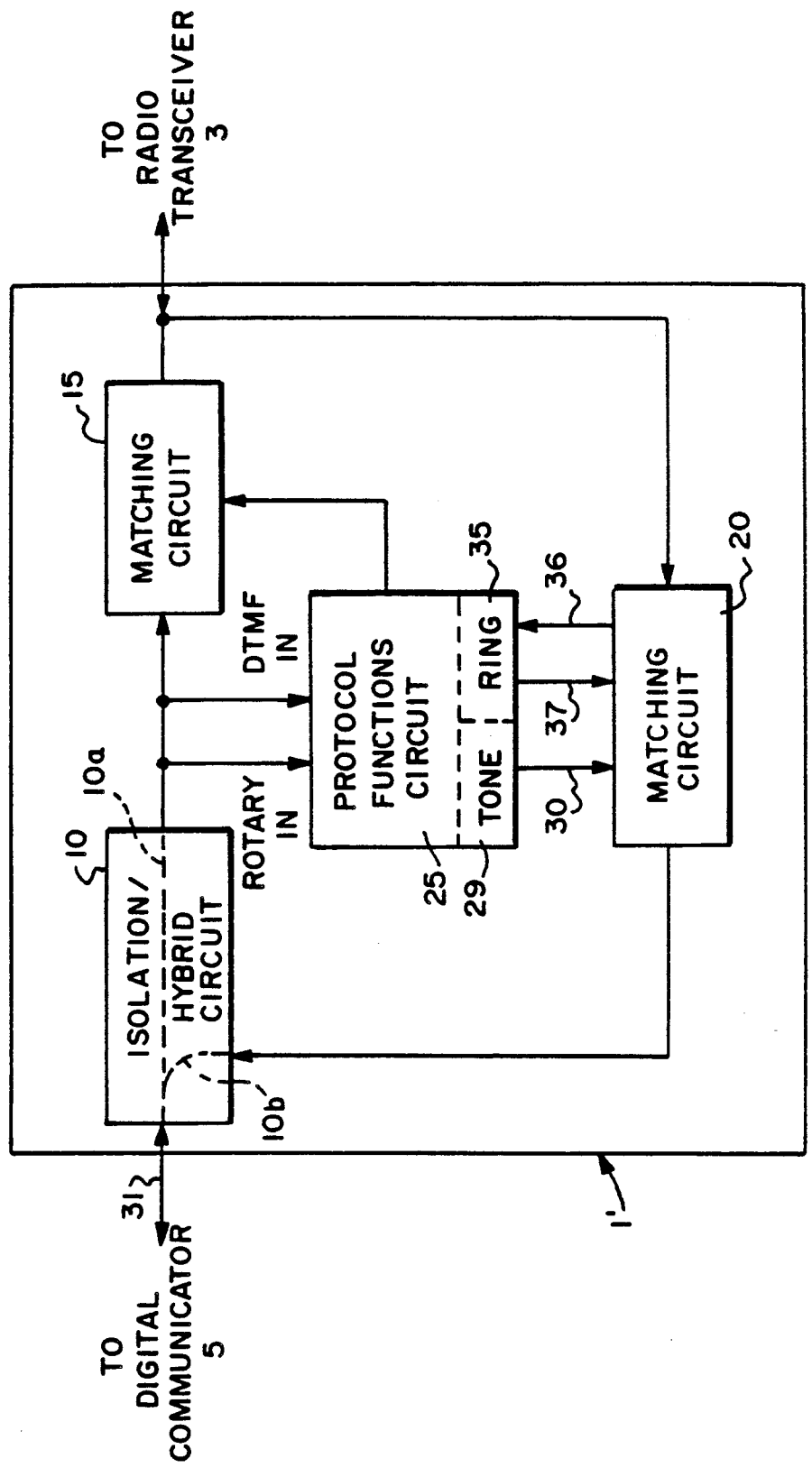
FIG. 5 is a block diagram showing use of the system interface of the present invention to permit two-way communications between an alarm reporting unit and a remote facility, using either a cellular radio transceiver or a wired communicating system.

In some cases, it may be desirable to resort to more costly radio communications to provide such supervisory signals to the alarm reporting unit 2, for example, where increased security is indicated. FIG. 5 illustrates use of the system interface of the present invention to provide such a function. The majority of the system interface 1' shown in FIG. 5 corresponds to the system interface 1 shown in FIG. 2 of the drawings, operating as previously described to enable the digital communicator 5 of the alarm reporting unit 2 to establish communications with a remote facility via the cellular radio transceiver 3. However, the system interface 1' of FIG. 5 additionally permits the remote facility to establish communications with the alarm reporting unit 2, via the cellular radio transceiver 3, by providing the protocol functions circuit 25 with a ring circuit 35 for interpreting communications received (signal path 36) from the central facility and for providing (signal path 37) the received communications to the alarm reporting unit 2 via the matching circuit 20. The ring circuit 35 includes ring detection means for recognizing that a call has been placed by the remote facility (irrespective of protocol) and ring generating means for providing signals to the alarm reporting unit 2 which will initiate its call receiving capabilities.

Figure 6:
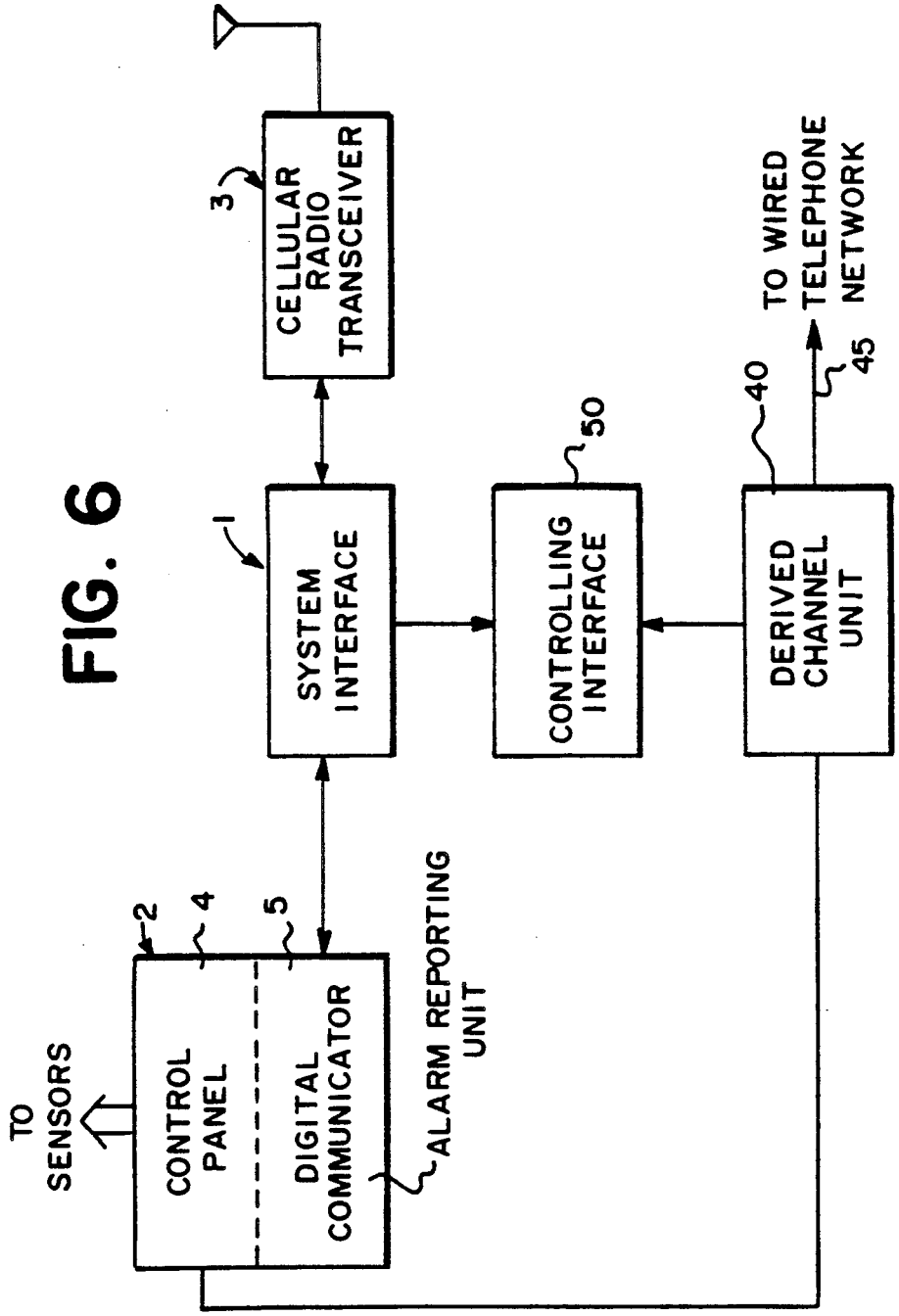
FIG. 6 is a block diagram showing use of the system interface of the present invention to interconnect an alarm reporting unit with both a cellular radio transceiver and a supervised, wired communicating system.

FIG. 6 illustrates use of the system interface 1 of the present invention to facilitate the implementation of even more comprehensive systems, such as the supervised, interactive alarm reporting system which is described in my prior co-pending U.S. patent application Ser. No. 062,174, now U.S. Pat. No. 4,868,859. In this configuration, the system interface 1 of the present invention is again used to interconnect the digital communicator 5 of the alarm reporting unit 2 and the cellular radio transceiver 3 In addition, a derived channel unit 40 interconnects the control panel 4 of the alarm reporting unit 2 with the conventional, wired telephone network 45. The system interface 1 and the derived channel unit 40 additionally communicate with a controlling interface 50 which operates as described in U.S. patent application Ser. No. 062,174, now U.S. Pat. No. 4,868,859 to provide a supervised, interactive alarm reporting system of improved reliability.

Accordingly, it is seen that the system interface 1 of the present invention serves well to satisfy each of the objectives previously set forth. It will also be understood that the system interface 1 of the present invention is capable of variation without departing from the spirit and scope of the present invention. For example, the configuration of the isolation/hybrid circuit 10, the matching circuits 15, 20, and the protocol functions circuit 25 may be varied according to the formats of the signals which are being produced by the digital communicator 5 and received by the cellular radio transceiver 3. Moreover, it is to be understood that the system interface 1 may be used in configurations other than those specifically illustrated in FIGS. 1, 4 and 6 of the drawings to effectively interconnect communicating equipment in accordance with the present invention.

Figure 7:
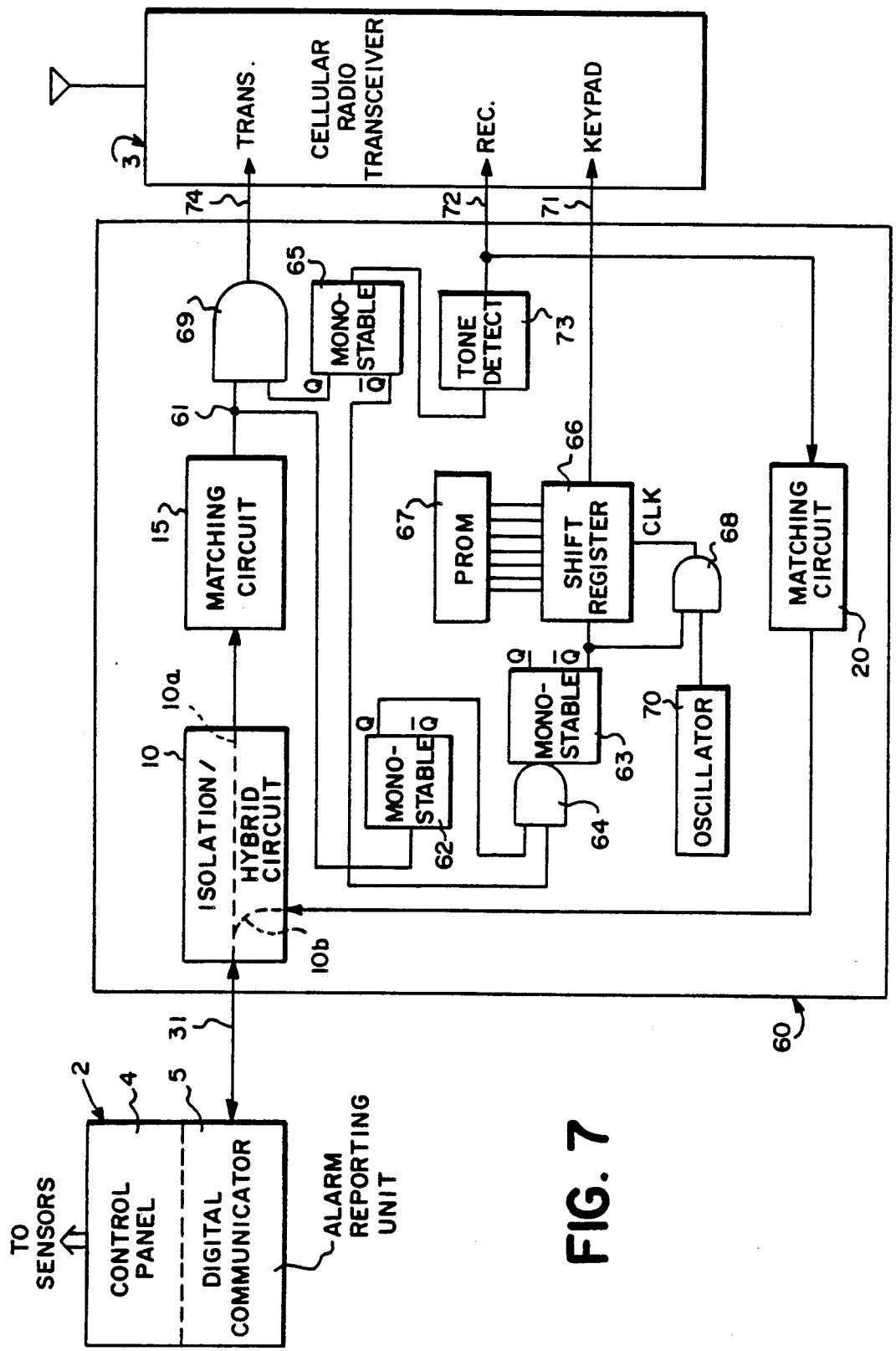
FIG. 7 is a block diagram showing a first alternative embodiment system interface of the present invention used to interconnect an alarm reporting unit with a cellular radio transceiver.
Figure 8:
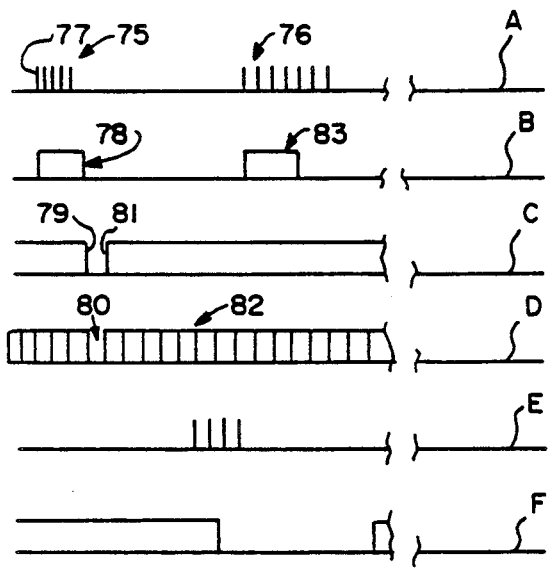
FIG. 8 is a graph showing a timing diagram for the system interface of FIG. 7.

It is even possible to develop a system interface which is fully independent of the protocol of the digital communicator 5, eliminating the need for the protocol functions circuit 25. FIG. 7 shows a system interface 60 for accomplishing this result. FIG. 8 shows characteristic signals associated with this system interface. The system interface 60 again includes an isolation/hybrid circuit 10 and matching circuits 15, 20 which operate as previously described to effectively match the alarm reporting unit 2 with the cellular radio transceiver 3, including any necessary level and format adjustments. The isolation/hybrid circuit 10 again operates to permit simultaneous connection of the alarm reporting unit 2 with both the cellular radio transceiver and the wired telephone network, if desired, to develop configurations such as are shown in FIGS. 4 and 6 of the drawings.

However, the protocol functions circuit 25 has been deleted in favor of components which, rather than using signals received from the digital communicator 5 to establish a connection through the cellular radio transceiver 3, make use of an independent system for establishing this connection. This eliminates the need to have to account for the protocol associated with the digital communicator 5, since the necessary signals reside within the system interface 60. Generally speaking, this is accomplished by using the output of the digital communicator 5 to merely initiate a separate dialing procedure within the system interface 60, rather than making use of the dialing information which is produced by the digital communicator 5. The necessary dialing procedures are then accomplished by the system interface 60, eliminating the need to account for the protocol of the digital communicator 5.

To this end, upon sensing an alarm condition, the digital communicator 5 of the alarm reporting unit 2 will initiate its data sequence in the usual fashion. This will in due course supply both dialing information (Curve A at 75) and status information (Curve A at 76) to the system interface 60, at 31. This information will be received by the matching circuit 15, which will then operate to pass the received sequence to a node at 61. Node 61 is coupled to a monostable circuit 62 so that the initial pulse (Curve A at 77) of the sequence which is received from the digital communicator 5 will toggle the monostable circuit 62 for a specified period of time (Curve B at 78). Monostable circuit 62 is in turn coupled to a monostable circuit 63, as a first input of a two-input AND circuit 64 The remaining input of AND circuit 64 is received from yet another monostable circuit 65. Since the signal which is received from the inverting output ($\overline{Q}$) of the monostable circuit 65 is normally on (i.e., a logic "1"), toggling of the monostable circuit 62 will cause the monostable circuit 63 to toggle, causing a transition at the inverting output ($\overline{Q}$) of the monostable circuit 63 (Curve C at 79). This transition is used to operate a shift register 66, which causes a desired telephone number (which is to be dialed) to be transferred from PROM 67 (where the number is stored) to the shift register 66. The inverting output ($\overline{Q}$) of the monostable circuit 63 additionally communicates with an AND circuit 68, which is configured to inhibit clock pulses from reaching the shift register 66 while the desired telephone number is being transferred from PROM 67 to the shift register 66 (Curve D at 80).

During this procedure, steps are taken to prevent the dialing information 75 which is then being received from the digital communicator 5 from reaching the cellular radio transceiver 3. This is accomplished by the AND circuit 69, which receives inputs from the matching circuit 15 (the data from the digital communicator 5), and the monostable circuit 65, which at the time is inhibiting.

After the monostable circuit 63 returns to its normal state (Curve C at 81), the output of the monostable circuit 63 will then operate to enable the AND circuit 68, permitting clocking of the shift register 66 (Curve D at 82) responsive to an oscillator 70. This will cause the telephone number stored in the shift register 66 to pass from the shift register 66 and to the cellular radio transceiver 3, at 71. The frequency of the oscillator 70 is selected to meet the rate which is required to enable a telephone number to be transmitted from the cellular radio transceiver 3 to the cellular radio network. This rate is significantly faster than the normal dialing rate for the digital communicator 5, which is ordinarily insufficient to permit a direct transfer of telephone number information by the cellular radio transceiver 3 without having to first temporarily store the information which is to be dialed, and to then initiate a command (a send command) which transfers the stored information at the high rate which is imposed by the cellular radio network. For this reason, it is generally necessary to modify the cellular radio transceiver 3 (through a modification of its software) so that it is always ready to send digits which it receives, without waiting for an initiating (send) command.

As is conventional, the digital communicator 5 will repeatedly attempt to establish communications with the central monitoring facility via the cellular radio transceiver 3, until such time as an acknowledgment is received that an effective connection has been made. These dialing operations are repeatedly performed as previously described, until such time as a suitable acknowledgment signal (Curve E) is received by the cellular radio transceiver 3, at 72. This acknowledgment signal is detected by a tone detection circuit 73, which in turn operates to toggle the monostable circuit 65 (Curve F). The non-inverting output (Q) of the monostable circuit 65 then operates to enable the AND circuit 69, allowing the status information which will be received from the digital communicator 5 (Curve A at 76) to pass to the cellular radio transceiver 3, at 74. The inverting output ($\overline{Q}$) of the monostable circuit 65 operates to inhibit the monostable circuit 63, preventing further transfers of data from PROM 67 to the shift register 66 (which would cause an undesired dialing procedure to occur following detection of the status information 76 by the monostable circuit 62, at 83 in Curve B). The acknowledgement signal (Curve E) is also provided to the digital communicator 5, via the matching circuit 20, to cause the digital communicator 5 to transmit the status information 76 in the usual manner.

The system interface 60 therefore operates to establish communications between the digital communicator 5 and the cellular radio transceiver 3 making use of a dialing number which is maintained within the system interface 60, and the status information which is received from the digital communicator 5. Accordingly, there is no need to account for the protocol of the digital communicator 5 since actual dialing is performed by the interface circuit 60. Communications received from the cellular radio transceiver 3 are effectively returned to the digital communicator 5 by means of the matching circuit 20, establishing two-way communications between the alarm reporting unit 2 and the remote location which is monitoring the alarm reporting unit 2, if desired.

Figure 9:
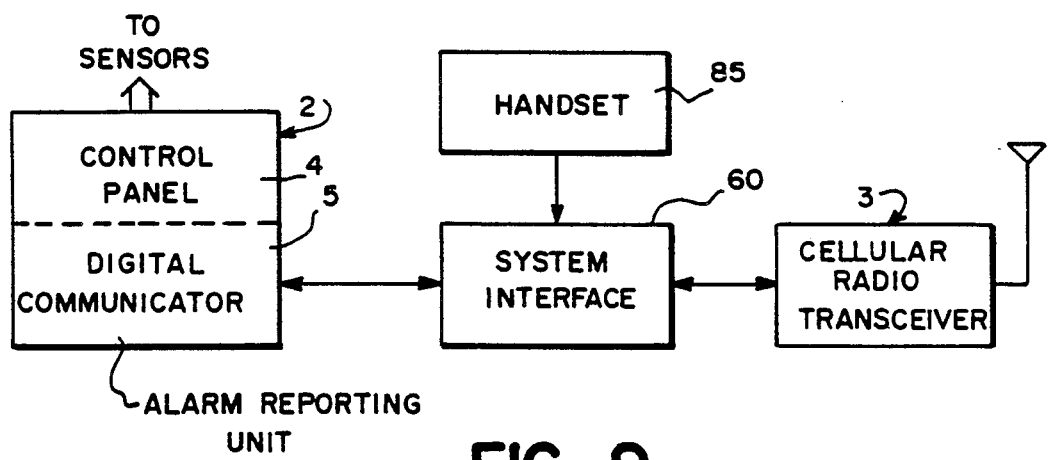
FIG. 9 is a block diagram showing a cellular radio transceiver which is capable of handling both voice and alarm data communications.

Since the system interface 60 illustrated in FIG. 7 operates to establish communications between the digital communicator 5 of the alarm reporting unit 2 and the cellular radio transceiver 3 without making use of the conventional store/send configuration which is normally employed by the cellular radio transceiver 3, the system interface 60 of FIG. 7 provides an additional enhancement in that it allows the alarm reporting unit 2 to be effectively coupled with the cellular radio transceiver 3 without interrupting the basic operations of the cellular radio transceiver itself. As shown in FIG. 9, this permits the cellular radio transceiver 3 to perform a dual function which permits normal cellular radio communications via a handset 85, as well as the transmission of alarm information making use of the system interface 60. Appropriate gating must be provided within the system interface 60 to prevent an attempted simultaneous transmission of voice and data communications. Preferably, this gating operates to provide the alarm information with priority over voice communications. It should be noted that with an appropriate adaptive connection, it is also possible to provide a similar capability in connection with other system interface configurations as well, including the system interface 1 and the system interface 1' previously described, and the alternative embodiment system interface to be described below.

Figure 10:
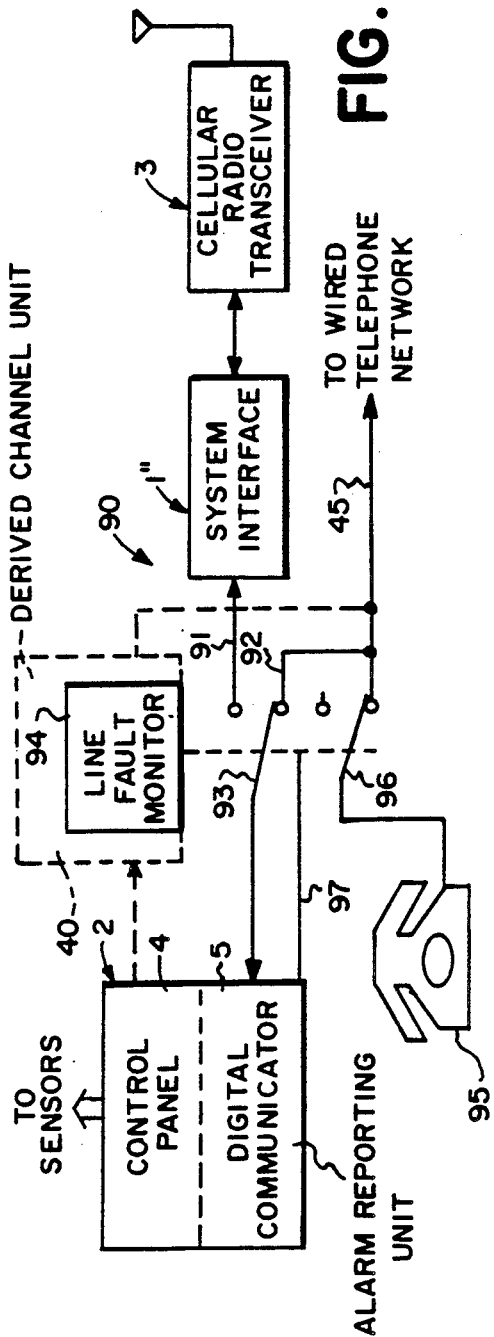
FIG. 10 is a block diagram showing use of a second alternative embodiment system interface of the present invention to selectively interconnect an alarm reporting unit with either a cellular radio transceiver or a wired communicating system.
Figure 11:
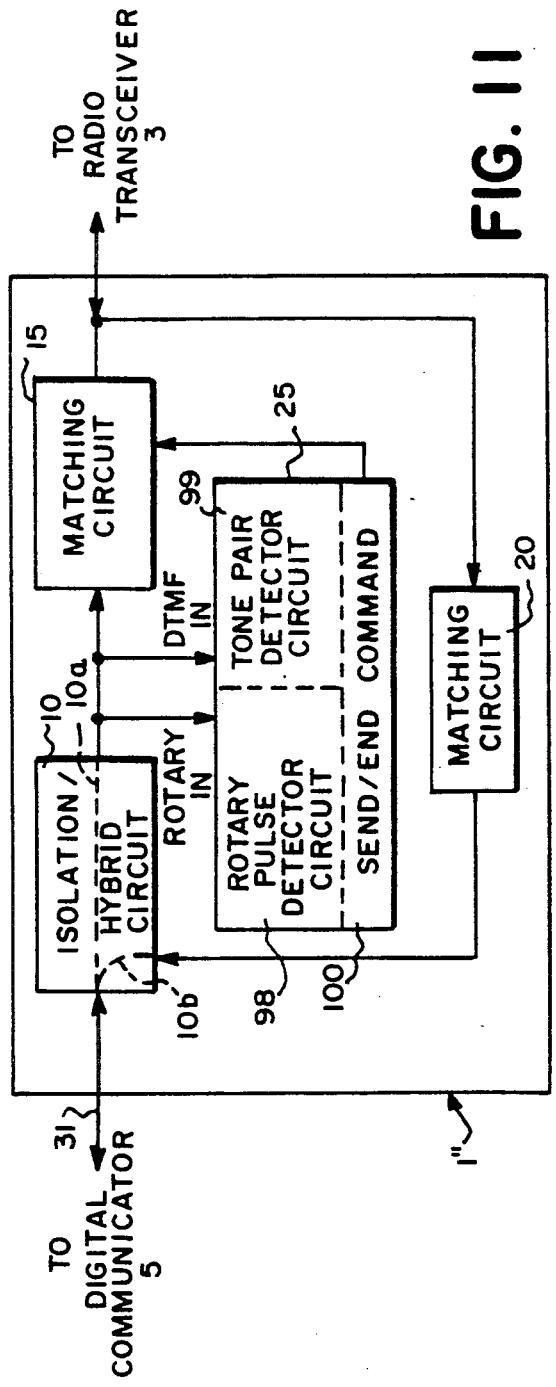
FIG. 11 is a block diagram showing the system interface of FIG. 10.

Yet another variation of the system interface of the present invention is shown in FIGS. 10 and 11. The configuration 90 shown in FIG. 10 again includes a system interface 1" coupled with a cellular radio transceiver 3, for receiving appropriate signals from the digital communicator 5 of the alarm reporting unit 2. However, in this case, signals produced by the digital communicator 5 are distributed between a cellular-based transmission path (comprised of the system interface 1" and the cellular radio transceiver 3) at 91, and a land-based transmission path (comprised of the wired telephone network 45) at 92. Selection between the transmission path 91 and the transmission path 92 is accomplished by a relay 93 which is operated responsive to a line fault monitor 94.

The relay 93 is configured to normally interconnect the alarm reporting unit 2 with the wired telephone network 45, at 92, so that communication between the alarm reporting unit 2 and the central monitoring facility will ordinarily take place through the wired telephone network 45. This has the advantage of providing a communicating path which is inexpensive to operate, and well adapted to the various types of communications which are presently desirable between the alarm reporting unit 2 and the central monitoring facility, including transfers of alarm data as well as the downloading of parameters and remote control signals received from the central monitoring facility.

In the event of an alarm, the alarm reporting unit 2 (which is then connected to the wired telephone network 45) will operate to supply alarm data to the central monitoring facility prompting an appropriate response based upon positive information received from the remote premises To permit the digital communicator 5 of the alarm reporting unit 2 to access the wired telephone network 45, steps are taken to decouple any telephones (e.g. the telephone 95) from the wired telephone network 45, to permit the digital communicator 5 to perform its desired dialing function. This is accomplished by a relay 96 which couples the telephone 95 with the wired telephone network 45 and which is operated (opened) responsive to an alarm indicating signal received from the digital communicator 5 of the alarm reporting unit 2, at 97. Thus, upon the detection of an alarm condition, a signal is provided at 97, opening the relay 96 and decoupling the telephone 95 from the wired telephone network 45 to permit the digital communicator 5 to perform its dialing function and access the wired telephone network 45 (through the connecting relay 93). After the alarm condition has cleared (has been reported), the relay 96 is returned to its normally closed state, to reconnect the telephone 95 to the wired telephone network 45.

Operations of this type will proceed until such time as the line fault monitor 94 determines that the wired telephone network 45 is no longer functional (or available). A variety of conventionally available devices are capable of making such a determination. In fact, it is even possible to employ similar functions which are conventionally associated with the derived channel unit 40 previously described, if used, which may then serve in place of the line fault monitor 94, if desired. In any event, upon detecting a fault, the line fault monitor 94 then operates the relay 93 to disconnect the digital communicator 5 of the alarm reporting unit 2 from the wired telephone network 45, and to connect the digital communicator 5 of the alarm reporting unit 2 with the system interface 1", at 91. This operates to decouple the system from a faulty wired telephone network, while providing necessary back-up via the cellular radio network. The system then operates as previously described to establish communications between the alarm reporting unit 2 and the central monitoring facility using the cellular radio transceiver 3, keeping the central monitoring facility fully advised of status conditions at the remote premises irrespective of the condition of the wired telephone network 45. After the fault has passed, the relay 93 is returned to its normal state, disconnecting the alarm reporting unit 2 from the cellular-based transmission path 91 and connecting the alarm reporting unit 2 to the land-based transmission path 92 (the wired telephone network 45).

Significant operational advantages result from this configuration. First, communications are normally accomplished using the wired telephone network, which is generally less expensive, and ordinarily satisfactory. Second, in the event of a fault in the wired telephone network, steps are taken to not only provide a parallel path for communicating with the central monitoring facility, but also to isolate the faulty wired telephone network from the remainder of the system.

Yet another advantage of the alarm monitoring system 90 illustrated in FIG. 10 is that it permits significant simplification of the system interface. Although the system interface may take any of a variety of forms including those which have previously been described, a simplified configuration such as is illustrated in FIG. 11 is also permitted resulting from the isolation which is provided by the controlled relay 93. Particularly important in this regard is that the isolation which the relay 93 provides is sufficient to permit the protocol of the signal which is received from the digital communicator 5 to be decoded using conventionally available devices, eliminating the need for the injected tones which were previously utilized for this purpose. This is accomplished by providing the system interface 1" with a protocol functions circuit 25 which includes a rotary pulse detection circuit 98, for receiving rotary pulse signals, and a tone pulse detection circuit 99, for receiving DTMF signals, according to the protocol of the digital communicator 5. These signals are then appropriately decoded and applied to a send-end command circuit 100, for appropriate application to the matching circuit 15 for further processing of the data which follows as previously described. To be noted is that this not only permits the use of standard components to accomplish such functions, but also eliminates the need for the injected tone used in connection with other embodiments of the present invention to detect rotary pulse signals, eliminating a potential cause for interference within the system.

Yet another advantage of the system 90 of FIG. 10, and the system interface 1" of FIG. 11, is that the relay 93 operates to effectively isolate the cellular-based transmission path 91 from the land-based transmission path 92, providing enhanced isolation within the system. In fact, such isolation will in many cases be sufficient to permit the isolation/hybrid circuit 10 to be deleted from the system interface, still further simplifying this component.

It will therefore be understood that various changes in the details, materials and arrangement of parts which have been herein described and illustrated in order to explain the nature of this invention may be made by those skilled in the art within the principle and scope of the invention as expressed in the following claims.

What is claimed is:

1. A system for interfacing an alarm reporting device with a cellular radio transceiver for communicating with an alarm monitoring facility, wherein said alarm reporting device includes a control panel for monitoring an alarm sensor and for providing a signal indicating status conditions of said alarm sensor and a digital communicator for delivering a signal to said radio transceiver which includes said status indicating signal preceded by a dialing signal, and wherein said system comprises:

means for electrically coupling signals associated with said alarm reporting device and signals associated with said radio transceiver, while simultaneously isolating said alarm reporting device from said radio transceiver;

means for matching signals received from said alarm reporting device to said radio transceiver; and means for matching signals received from said radio transceiver to said alarm reporting device;

wherein said coupling means is configured for simultaneous connection to a wired telephone network, and for placing said alarm reporting device in communication with said alarm monitoring facility using said wired telephone network; and means for inhibiting the dialing signal received from said digital communicator, and means for developing a dialing signal for delivery to said radio transceiver, whereby the dialing signal developed by said interfacing system is substituted for the dialing signal developed by said digital communicator;

wherein said inhibiting means inhibits the dialing signal received from said digital communicator, but does not inhibit the status indicating signal received from said digital communicator.

2. The system of claim 1 wherein said alarm reporting device includes a control panel for monitoring said alarm sensor and for providing said status indicating signal, and a digital communicator for delivering said status indicating signal to said radio transceiver.

3. The system of claim 2 wherein said digital communicator operates according to a dual tone multi-frequency signal protocol or a rotary signal protocol.

4. The system of claim 3 wherein said system further includes means for interpreting said status indicating signal irrespective of said protocol.

5. The system of claim 4 wherein said interpreting means comprises:
   means for recognizing pulses associated with said status indicating signal;
   means communicating with said recognizing means for converting said recognized pulses into a digit in a dialing sequence; and
   means communicating with said converting means for delivering said dialing sequence to said radio transceiver, to establish communications with said alarm monitoring facility.

6. The system of claim 5 wherein said protocol is a dual tone multi-frequency signal protocol and said recognizing means is a tone-pair detection means.

7. The system of claim 5 wherein said protocol is a rotary signal protocol and said recognizing means is a rotary pulse detection means.

8. The system of claim 7 wherein said recognizing means comprises:
   means for introducing a signal at the output of said alarm reporting device, so that the impedance at said output will vary in accordance with pulses of said rotary signal; and
   means for monitoring the output of said alarm reporting device, for detecting signal levels resulting from said variations in impedance.

9. The system of claim 8 wherein said introduced signal has a frequency of from 10 to 30 kHz.

10. The system of claim 2 wherein said means for matching signals received from said alarm reporting device to said radio transceiver includes means for matching the voltage level and format of said signals received from said alarm reporting device to voltage level and format conditions associated with said radio transceiver.

11. The system of claim 2 wherein said means for matching signals received from said radio transceiver to said alarm reporting device includes means for matching the voltage level and format of said signals received from said radio transceiver to voltage level and format conditions associated with said alarm reporting device.

12. The system of claim 11 wherein said signals received from said radio transceiver are acknowledgement signals received from said alarm monitoring facility to regulate the delivering of signals from said alarm reporting device.

13. The system of claim 1 wherein said digital communicator operates according to a specified protocol, and said interfacing system operates irrespective of said protocol.

14. The system of claim 1 wherein said radio transceiver operates according to a specified protocol, and wherein said interfacing system operates according to a protocol which matches the protocol of said radio transceiver.

15. The system of claim 1 wherein said inhibiting means is responsive to acknowledgement signals received from said radio transceiver.

16. The system of claim 1 wherein said developing means develops said dialing signal responsive to the dialing signal from said digital communicator.

17. The system of claim 16 wherein said developing means comprises memory means for storing a desired telephone number and shift register means for receiving said telephone number from said memory means and for serially delivering said telephone number to said radio transceiver.

18. The system of claim 17 wherein said telephone number is transferred from said memory means to said shift register means when said shift register means detects the dialing signal from said digital communicator.

19. The system of claim 18 wherein said telephone number is serially delivered from said shift register means at a rate which matches a required transmission rate associated with said radio transceiver.

20. The system of claim 19 wherein said radio transceiver operates to transmit said telephone number as it is received from said shift register means.

21. The system of claim 1 wherein a relay selectively electrically couples said alarm reporting device with said cellular radio transceiver and said wired telephone network.

22. The system of claim 21 wherein said relay is a two position switch for coupling said alarm reporting device with either said cellular radio transceiver or said wired telephone network.

23. The system of claim 22 wherein said relay normally connects said alarm reporting device with said wired telephone network, isolating said alarm reporting device from said cellular radio transceiver.

24. The system of claim 23 wherein said interfacing system further comprises means for detecting a fault in said wired telephone network and for operating said relay to isolate said alarm reporting device from said wired telephone network and to electrically connect said alarm reporting device with said cellular radio transceiver.

25. The system of claim 24 wherein a telephone is selectively coupled with said wired telephone network by a relay for normally electrically coupling said telephone and said wired telephone network, and for electrically disconnecting said telephone from said wired telephone network when an alarm condition is signaled.

26. The system of claim 1 wherein said coupling means is configured for placing said alarm reporting device in substantially continuous communication with said alarm monitoring facility using said wired telephone network.

27. The system of claim 1 wherein said alarm reporting device is placed in communication with said alarm monitoring facility independent of said status indicating signal.

* * * * *